(No Model.)
C. E. BURBANK.
SCRAPER.
No. 541,808. Patented June 25, 1895.
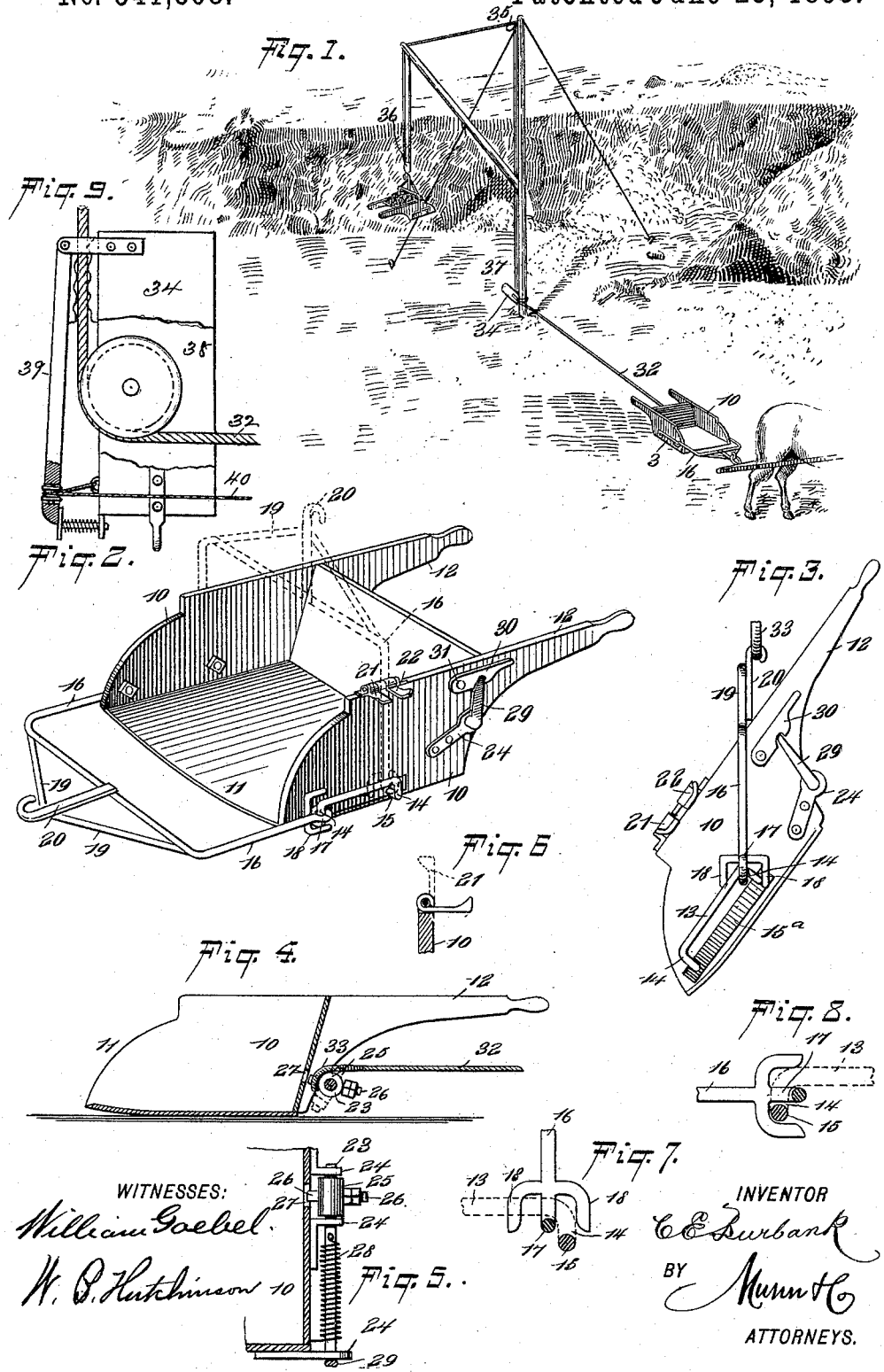
WITNESSES:
William Goebel
W. P. Hutchinson
INVENTOR
C. E. Burbank
BY
Munn & Co
ATTORNEYS.

UNITED STATES PATENT OFFICE.

CLEMENT E. BURBANK, OF NEW YORK, N. Y.

SCRAPER.

SPECIFICATION forming part of Letters Patent No. 541,808, dated June 25, 1895.

Application filed September 19, 1894. Serial No. 523,436. (No model.)

*To all whom it may concern:*

Be it known that I, CLEMENT E. BURBANK, of New York city, in the county and State of New York, have invented a new and Improved Scraper, of which the following is a full, clear, and exact description.

My invention relates to improvements in scrapers such as are adapted to be guided by hand and drawn by horses, or other animals, to fill them with dirt.

The object of my invention is to produce a scraper which is very strong without being heavier than the ordinary scraper and which is especially adapted for use in connection with a derrick or other hoisting apparatus to lift the scraper, the latter having means for holding its bail in position to conveniently fill the scraper, to lift it bodily when necessary, and to dump it when desired, also to provide a tripping device which enables the scraper to be quickly released from a line attached to it to hoist another scraper, all as hereinafter described.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a perspective view showing the manner in which one scraper is connected with another so that the hauling of the first scraper raises the second. Fig. 2 is a detail perspective view of the scraper in position to be drawn and filled. Fig. 3 is a side elevation of the scraper in position to be dumped. Fig. 4 is a longitudinal section of the scraper, showing its connection with the hoisting line. Fig. 5 is a sectional plan, showing in detail the mechanism for tripping the hoisting line. Fig. 6 is a detail sectional view of one of the catches on the scraper. Fig. 7 is a detail sectional view showing the position of the bail in relation to one of the side brackets when the bail is in position to lift the scraper. Fig. 8 is a similar view, showing the positions of the bail and bracket when the bail is in position to haul the scraper, and Fig. 9 is a detail view partly in section of the grip.

The scraper 10 is of the usual shape having the ordinary open front 11 and the rearwardly-extending handles 12, and the shape may be modified or changed without affecting the principle of my invention which relates wholly to the scraper attachments.

On the sides of the scraper are longitudinal brackets 13 which are bent downward at the ends, as shown at 14, so that they may be properly engaged by the hauling and hoisting bail, as described presently, and the extreme end portions of the brackets are bent inward, as shown at 15, so as to connect with the sides of the scraper while opposite the brackets are plates 15ª which serve as wear plates.

The scraper 10 is provided with a bail 16 which is capable of swinging upward over the scraper top, or forward in front of it, the bail having eyes 17 at its ends to connect with and slide on the brackets 13, and on opposite sides of the eyes 17 are hooks 18 which are adapted to swing beneath the part 15 of the brackets when the scraper is to be hauled or dumped, as shown in Figs. 2, 3 and 8.

The bail 16 has a cross bar to which the hoisting hook is secured and from which it projects as shown, and braces 19 are secured to said hook and extend thence to and are secured to the bail preferably at the corners thereof as best shown in Fig. 2. This construction makes the bail exceptionally strong without materially increasing its weight.

On one side of the scraper and on the top edge are vertically swinging catches 21 and 22, which normally extend outward at right angles to the scraper and into the path of the bail, sufficient space being left between these catches to enable the bail to lie between them, as shown by dotted lines in Fig. 2. The outer, front corner of the catch 21 is bent upward and the outer rear corner of the catch 22 is similarly bent, and thus when the bail is thrown up from the front it automatically raises the front catch and when the bail is swung up from the rear it raises the rear catch, which acts in a similar way. I have shown the catches on one side only of the scraper, but, if desired, they may be applied to both sides at once.

On the back of the scraper, near the bottom, is a transverse shaft 23 which is hung in suitable brackets 24, and this shaft carries a collar 25 on which is a latch 26 which is adapted to register with a hole 27 in the scraper and is also adapted to engage a loop of a hoisting rope, as hereinafter described. The shaft is encircled by a spiral spring 28, one end of which is secured to the shaft and the other to the scraper, or other rigid support, and the tension of the spring is such as to hold the latch opposite the hole 27, as in Fig. 5. At the outer end of the shaft is a crank 29 which is adapted to engage a notched latch 30, which is pivoted on the side of the scraper, as shown in Fig. 3, and when the latch engages the crank, the latter, the shaft 23, and the latch 26 are locked, but by raising the latch 30 the latch 26 may be turned against the tension of the spring 28.

The latch 26 is adapted to engage a loop 33 on the end of the hoisting rope 32, which is intended to run through a clutch 34 by which the rope may be rigidly secured, when desired, and over the pulleys 35 and 36 of an ordinary derrick 37 and connect with the bail of another scraper, as shown in Fig. 1.

The grip 34 may be of any suitable construction, that shown consisting of the pulley carrying section 38, the spring actuated section 39 and the operating rope 40 by which the section 39 may be drawn against the action of its spring to grip or clamp the rope 32.

The scrapers are used in pairs, one being drawn away from the derrick to the place where it is to be filled and the second one with its load is raised by drawing away the first one, as described below. The scraper is filled in the usual manner, after which the bail is turned up to a vertical position, as shown in Fig. 2, and connected with the hoisting rope of the derrick to enable it to be raised, and the hoisting rope is fastened, as described, to the latch 26 of a scraper which has been previously emptied, and when the emptied scraper is drawn away the loaded scraper is raised. When the scraper is raised a sufficient distance the grip 34 is fastened and the latch 30 of the empty scraper is raised so as to release the latch 26, and the strain of the rope 32 tips the latch and releases the rope.

To dump the scraper after it is raised, the rear catch 22 is elevated and the handles 12 raised, as shown in Fig. 3, the bail permitting the scraper to tilt, as shown in the last figure, so that the load slides from the scraper. It will be seen that the bail is hung in such a way that it may slide on the bracket 13, so that when the scraper is being hauled the bail is at the front end of the bracket in its proper position, but when the scraper is being raised and dumped the bail slides back in the bracket and is in the best possible position for raising and dumping the scraper.

Having thus described my invention, I claim as new and desire to secure by Letters Patent—

1. The combination, with the scraper, of the side brackets thereon, the hauling and hoisting bail arranged to slide on the brackets, from hauling to hoisting position, and latch devices by which to lock the bail in hoisting position substantially as described.

2. The combination, with the scraper, of the side brackets thereon, the bail arranged to slide on the brackets and to swing over the scraper top, and catches on the scraper to engage the bail, and by which the latter may be locked in hoisting position substantially as described.

3. The combination, with the scraper and the swinging bail, of the side catches on the scraper to engage the bail, the catches being inclined at their outer edges, substantially as described.

4. The combination, with the scraper and the side brackets having end bends, of the bail held to slide on the brackets and provided with hooks to engage the bent ends of the brackets, substantially as described.

5. The combination, with the scraper, of the spring pressed latch on the back of the scraper, and a tripping device to release and lock the latch, substantially as described.

6. The combination with the scraper, of the spring pressed shaft on the back of the scraper, the latch carried by the shaft, and means, as the crank on the shaft and the notched latch, to lock the shaft and the first latch, substantially as described.

7. A scraper substantially as described provided with a rope securing latch and with a tripping device by which to lock and release the said latch, substantially as set forth.

8. A scraper provided with elongated side brackets combined with the bail held to and movable along said brackets and locking devices carried by the bail and by which the said bail may be held at the end of the brackets, substantially as shown and described.

9. The combination with the scraper, of the side brackets, the bail connected with said brackets and arranged for adjustment to position for hauling or hoisting, a latch device by which the bail may be held to the scraper in hoisting position and locking devices by which to lock the bail from movement along the brackets when such bail is in hoisting position, all substantially as and for the purposes set forth.

CLEMENT E. BURBANK.

Witnesses:
ERLE C. BENSON,
CHARLES YOUNG.